Jan. 21, 1969  A. J. KORECKY  3,423,115
BALL AND SOCKET JOINT
Filed Oct. 4, 1967
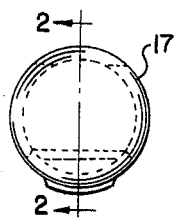
FIG.1
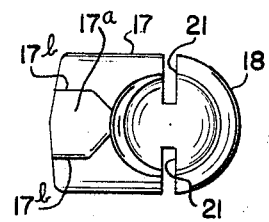
FIG.2
FIG.3
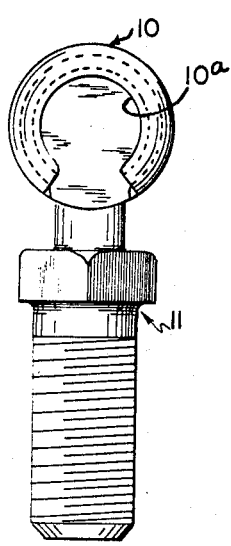
FIG.4
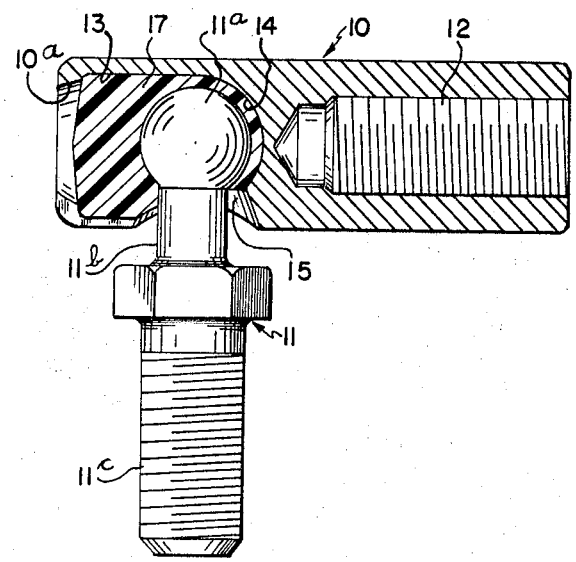
FIG. 5
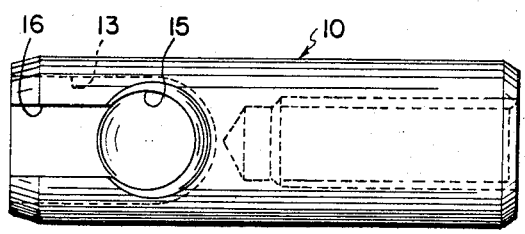
FIG. 6
INVENTOR.
ALLAN J. KORECKY
BY
Baldwin, Doran & Egan
ATTORNEYS

United States Patent Office 3,423,115
Patented Jan. 21, 1969

3,423,115
BALL AND SOCKET JOINT
Allan J. Korecky, Cleveland, Ohio, assignor to Barmatic Machines, Inc., Cleveland, Ohio, a corporation of Ohio
Filed Oct. 4, 1967, Ser. No. 672,795
U.S. Cl. 287—90　　　　　　　　　　　　　　　7 Claims
Int. Cl. F16b 7/00; F16c 11/08

ABSTRACT OF THE DISCLOSURE

A simple ball and socket connection is provided between a ball stud and a rod end by providing a recess opening endwise of the rod end and terminating inwardly in a generally hemispherical inner end of the recess and then providing a generally cylindrical seat member of anti-friction elastomeric material adapted to telescope snugly into the rod recess with the seat member having an inner end complementary to the bottom of the recess. A generally spherical socket to receive the ball is provided at the inner end of the seat member opening laterally out through one side of the member and through a corresponding generally circular opening in the wall of the rod member. The socket is smaller in diameter than the ball whereby it is necessary to snap the ball into the socket utilizing the resiliency of the seat member material. A side wall of the recess is slotted from the circular opening outwardly to the end of the rod to permit passage of the stem which supports the ball; so that, after the ball is assembled in the socket of the seat member; then this assembly may be slipped endwise in the recess until the seat member bottoms in the recess. The end of the rod member is then peened over the seat member to hold the parts assembled.

---

This invention relates to improvements in a ball and socket joint wherein in addition to the parts to be connected, there is required only a plastic seat member which is readily assembled with a ball stud, after which this subassembly is easily inserted in the end of a rod to be connected to the ball stud.

The objects and advantages of this invention will be apparent in the accompanying drawings and description and the essential features will be summarized in the claims.

In the drawings,

FIG. 1 is an end elevation of a plastic seat member utilized in this invention;

FIG. 2 is a central sectional view of the same taken along the line 2—2 of FIG. 1;

FIG. 3 is a bottom plan view of the device of FIGS. 1 and 2;

FIG. 4 is an end elevational view of the joint completely assembled;

FIG. 5 is a central sectional view through the parts of FIG. 4; while

FIG. 6 is a bottom plan view of the rod end housing of FIG. 5 before assembly.

The parts to be connected as shown in the drawings comprise a tie rod end housing 10 and a ball stud member 11. This ball stud member comprises a generally spherical ball 11a connected by a stem 11b of lesser diameter to a stud 11c adapted to be connected to any suitable part by means of threads or the like.

The rod end housing 10 has a central threaded bore 12 at one end for attachment to a tie rod or the like. The opposite end has a generally cylindrical recess 13 opening at the left-hand end of the housing end as shown in FIGS. 5 and 6 and terminating at its inner closed end preferably in a generally hemispherical seat 14. The recess is provided with a laterally opening generally circular outlet 15 through which the stem 11b may project. A slot 16 is provided, as clearly shown in FIG. 6, communicating between the circular opening 15 and the end of the rod end member. The parallel side edges of this slot are spaced sufficiently to allow the stem 11b to pass rather snugly between them to a position concentric with the circular opening 15.

The seat member 17 is the sole member necessary to connect the parts 10 and 11 together using this invention. The main portion of this seat member is adapted to telescope endwise in the recess 13 and to fit snugly therein. Where the recess is generally cylindrical, the outer walls of the seat member 17 are complementary and cylindrical also and adapted to fit snugly within the recess. The inner end of the seat member is generally hemispherical as shown at 18 and adapted to fit snugly in the hemispherical seat 14. The inner end of the seat member has a generally spherical socket 19 of the same diameter as that of the ball 11a and opens laterally outwardly at 19a in a generally circular opening so that in assembling the ball in the socket it is necessary to snap the same into position. Preferably but not necessarily, the walls 20 about the opening 19a are believed to facilitate the assembly of the ball into the socket. Preferably, a pair of slots 21 are provided generally on a diameter of the spherical socket 19 in a plane at right angles to the axis of the cylindrical seat member and on opposite sides of the ball 11a. This aids in snapping ball 11a into socket 19, and helps the resilient gripping action between the seat member and the ball when the seat member is pressed longitudinally inward.

Where the recess 13 and seat member 17 are generally cylindrical, it is desirable to have interfitting key parts to prevent relative rotation between them. In FIGS. 1, 3 and 5, a projection 17a integral with the seat member is provided which extends outwardly through the parallel edges of the slot 16 so that the parallel edges 17b of the projection fit snugly in the slot 16. This not only prevents rotation of the parts but also insures the concentric assembly of the parts.

The assembly of the completed joint should now be apparent. The ball 11a is first snapped into the socket 19 aided by slots 21, if these are provided, after which the seat member 17 is telescoped endwise into the recess 13 until it bottoms in the seat 14 at the inner closed end of recess 13. During this operation, the stem 11b passes through the slotted opening 16 until the parts reach the position of FIG. 5 with openings 15 and 19a substantially concentric. Then the ends 10a of the rod member 10 are peened over against the seat member 13 exerting endwise pressure toward the right as seen in FIG. 5 and tending to close the slots 21, if any, so that the seat member socket firmly grips the ball 11a, and the seat member is bottomed in recess 13.

The material for the seat member 17 is an anti-friction, self-lubricating elastomeric material having good bearing qualities. One such material is Delrin which is the trade name of a material marketed by E. I. DuPont DeNemours & Co., although nylon is an acceptable substitute. These materials have the necessary strength, resilience and bearing qualities to provide long service with a minimum of wear. These materials are substantially self-lubricating.

It will thus be seen that I have provided a very simple ball and socket connection requiring only one part which is inexpensive and easily assembled.

What is claimed is:

1. A ball and socket joint comprising a rod having an axially extending recess in one end thereof; said recess opening thru the end of said rod and having an inner closed end; there being a lateral generally circular opening through a wall of said recess near its closed end and a slot through said wall communicating with said opening and having parallel edges extending longitudinally to said one end of said rod; a stud having a spherical ball at one end and a stem of less diameter than said ball rigidly connecting said ball to said stud; said generally circular opening having a diameter less than said ball; said slot being wider than said stem; an elastomeric seat member having a body slidable longitudinally of said recess and having a cross-section complementary to, and snugly received in, said recess; there being a socket in said inner end of said seat member adapted to snugly receive said stud ball; said socket having a generally circular opening concentric with said first named generally circular opening when said seat member abuts said inner closed end of said recess; said seat member being sufficiently resilient and the size of the parts being arranged to permit said ball to snap into said socket; whereby said ball may be engaged in said socket and said seat member passed into said recess to its inner end by passing said stem through said slot; and retaining means at the open end of said recess retaining said seat member in said recess; said seat member providing the sole connecting part between said rod and said stud said recess terminating in a generally concave seat at its inner end; and said seat member extending from said concave seat to said retaining means and having a generally convex inner end complementary to said seat.

2. The combination defined in claim 1, wherein said seat member is an anti-friction, self-lubricating elastomeric material having good bearing qualities.

3. The combination defined in claim 1, wherein said recess has cylindrical walls.

4. The combination defined in claim 1, wherein said means retaining said seat member in said recess comprises the walls of said rod at the outer end of said recess peened over on said seat member.

5. The combination defined in claim 1, wherein said recess and said seat member are generally cylindrical, said socket is generally spherical and said seat member has slots generally on a diameter of said spherical socket in a plane at right angles to the axis of said seat member and on opposite sides of said ball, and said seat member retaining means exerts pressure longitudinally of said seat member and tending to close said slots so that said socket firmly grips said ball.

6. The combination defined in claim 1, wherein interfitting key parts are provided on said rod and on said seat member for preventing relative rotation between them.

7. The combination defined in claim 6, wherein said interfitting key parts comprise a projection on said seat member closely fitting in said slot when said seat member is fully inserted in said recess.

References Cited

UNITED STATES PATENTS

| | | |
|---|---|---|
| 1,450,665 | 4/1923 | Crozier. |
| 3,013,829 | 12/1961 | Marquis. |
| 3,068,031 | 12/1962 | Herbenar et al. |
| 3,165,343 | 1/1965 | Gottschald _____ 287—87 |
| 3,308,906 | 3/1967 | Burke. |

FOREIGN PATENTS

| | | |
|---|---|---|
| 552,405 | 4/1943 | Great Britain. |
| 560,427 | 4/1944 | Great Britain. |

CARL W. TOMLIN, *Primary Examiner.*

ANDREW V. KUNDRAT, *Assistant Examiner.*